March 24, 1931.  H. B. WESSON  1,797,743
INSECT TRAP
Filed May 7, 1929
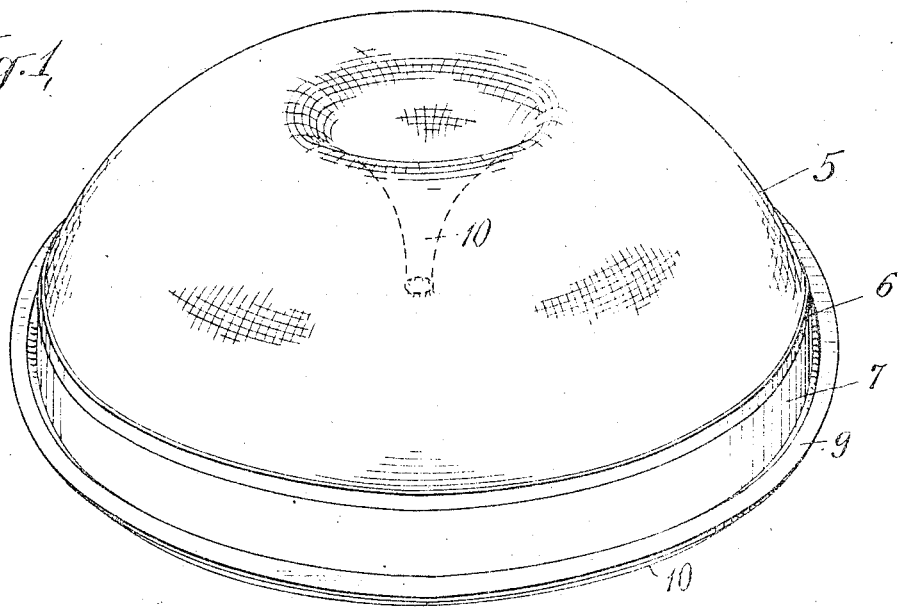
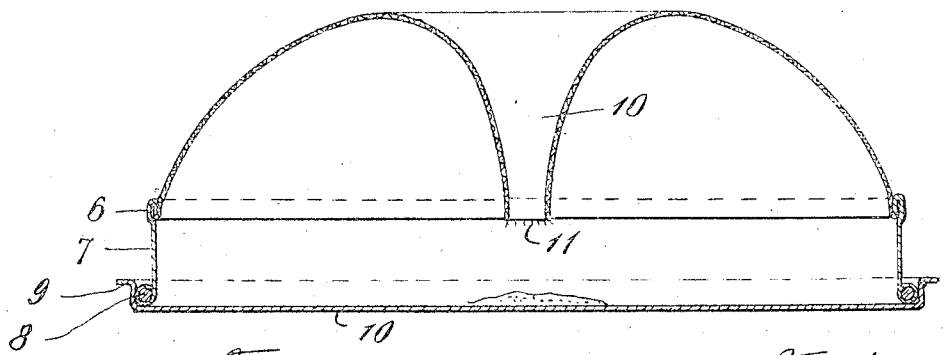
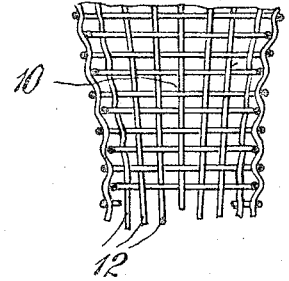
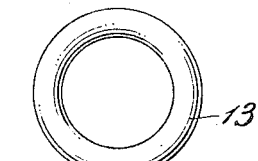
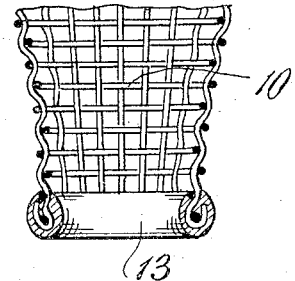
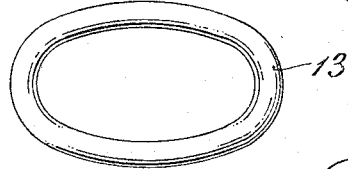
INVENTOR
Harry B. Wesson
BY
ATTORNEYS Patented Mar. 24, 1931

1,797,743

UNITED STATES PATENT OFFICE

HARRY B. WESSON, OF TAMPA, FLORIDA

INSECT TRAP

Application filed May 7, 1929. Serial No. 361,066.

This invention relates to traps for insects such as roaches and particularly to a simple, inexpensive and effective device from which the insects cannot escape, although they may enter easily.

In certain sections of the country roaches and similar insects grow to relatively large size and are a nuisance and a serious menace to health. The usual method of destroying such pests is to supply them with poison food. This, however, leads to disagreeable consequences if the insects die in hidden crevices or are picked up and eaten by poultry.

The object of the present invention is to provide an effective trap into which the insects can be lured by food or otherwise and in which they can be destroyed.

Other objects and advantages of the invention will be apparent as it is better understood by reference to the following specification and the accompanying drawing, in which Fig. 1 is a view in perspective of a trap embodying the invention;

Fig. 2 is a transverse section through the trap;

Fig. 3 is an enlarged detail in section of the entrance to the trap;

Fig. 4 is a view similar to Fig. 3 showing a slightly modified arrangement, and

Figs. 5 and 6 are plan views of different forms of the opening through which the insects may enter the trap.

In carrying out the invention, I provide a cage of wire cloth or similar material which is preferably hemispherical in form and is provided at its lower edge with a stiffening band or flange of metal or other suitable material. The flange is adapted to engage frictionally or otherwise with a corresponding flange of a plate or pan which serves as a bottom for the trap. The plate or pan is preferably made of some suitable metal, and a convenient arrangement is to provide a friction joint between the two sections of the trap so that they can be separated readily to permit removal of the insects which have entered the trap.

To permit ingress of the insects I provide a conical depression at the top of the wire cage terminating in an opening which permits the insects to enter the trap. The depression and the opening at the end thereof may be formed by subjecting the cage of wire cloth to the action of suitable dies which depress the fabric and sever the wires about the opening.

The ends of the wires at the opening may be left in a ragged condition, that is with the wires projecting about the opening. Such an arrangement assists in preventing the insects from returning through the opening. It may, however, be desirable, principally for the sake of appearance, to finish the opening by a band or ferrule. Such a ferrule may be formed readily by dipping the ends of the wires at the opening in a bath of solder.

The opening through which the insects enter may be circular, but I have found that the most practicable form is substantially oval. Insects can enter readily through such an opening, but escape therethrough is difficult and in most cases impossible.

In the apparatus as described, I may place suitable food or bait which will attract the insects. The latter crawl over the outside of the cage, enter the depression and descend therein until they finally drop through the opening onto the bottom. When once in the trap, the only possibility of escape is for the insect to jump through the opening, and my experience with traps of the character described has demonstrated that escape in this manner is rarely accomplished.

The preferred form of the apparatus is illustrated in the accompanying drawing, in which 5 indicates a cage of wire cloth or other suitable material which is generally hemispherical in form. The lower edge of the cage is secured by a joint 6 to an annular flange 7 which is preferably of metal. The flange may have a rolled edge 8 which is adapted to co-operate with a flange 9 on a pan 10 which forms the bottom of the trap. A friction joint between the edge 8 and the flange 9 is preferred, although the connection may be made in any suitable manner.

The top of the cage 5 is depressed to form an entrance passage 10 extending to an opening 11 through which the insects enter the trap. The edge of the wire cloth surrounding the opening may have the wires 12 projecting therefrom as indicated in Fig. 3, or the edge may be surrounded with a ferrule 13 as indicated in Fig. 4. The former arrangement is preferred because the wires impede the attempt of the insect to escape through the opening. As shown by the drawings the frayed ends of the wires 12 may be bent back from the opening so as to make the opening more attractive to the roaches, it having been found that roaches will more readily enter through an opening where the frayed ends of the wires are turned back than when they are permitted to extend straight downwardly. As indicated in Figs. 5 and 6, the opening may be circular or oval, the latter form being preferred. It is to be understood that while Figs. 5 and 6 illustrate a ferrule 13 applied to the edge of the opening, either form of opening may be employed with projecting wires 12 as shown in Fig. 3.

The trap as described is a most effective apparatus for collecting insects such as roaches. I have found that such insects will enter the trap readily and that large numbers of them can be collected therein in a brief period. They can be destroyed by scalding or otherwise. The remains can be removed easily from the trap by separating the bottom from the cage and the trap is then ready to collect more of the insects.

Various changes may be made in the details of construction and arrangement of the apparatus without departing from the invention or sacrificing any of the advantages thereof.

I claim:

1. A trap for insects comprising a cage of wire cloth and a bottom, said cage having a generally dome-shaped top with an entrance passage therethrough, said entrance passage being defined throughout its entire length by a depressed portion of the wire cloth.

2. A trap for insects comprising a cage of wire cloth and a bottom, said cage having a generally dome-shaped top with an entrance passage therethrough terminating in an oval-shaped opening, said entrance passage being defined throughout its entire length by a depressed portion of the wire cloth.

3. A trap for insects comprising a cage of wire cloth and a bottom, said cage having a generally dome-shaped top with an entrance passage therethrough, said cage having a downwardly extending lip with a fringe of projecting ends of the wire forming the cloth and terminating in an oval-shaped opening, said entrance passage being defined throughout its entire length by a depressed portion of the wire cloth.

4. A trap for insects comprising a cage and a bottom, said cage having a generally dome-shaped top with an entrance passage therethrough, the inner end of the entrance passage being formed of wire mesh having a frayed inner end with the wires thereof diverging from said inner end.

In testimony whereof I affix my signature.

HARRY B. WESSON.